Feb. 4, 1969  W. KANDELL ET AL  3,425,285

DRIVE FOR ROTARY OBJECTS

Filed March 2, 1966

INVENTORS
WALTER KANDELL
JOZSEF PIROSKA

United States Patent Office

3,425,285
Patented Feb. 4, 1969

3,425,285
DRIVE FOR ROTARY OBJECTS
Walter Kandell, Anders Reimers vag 13, Stockholm, Sweden, and Jozsef Piroska, Kallangsvagen 16, Lidingo, Sweden
Filed Mar. 2, 1966, Ser. No. 531,256
Claims priority application Sweden, Mar. 5, 1965, 2,932/65
U.S. Cl. 74—29                    8 Claims
Int. Cl. F16h *1/12, 19/04, 19/08*

ABSTRACT OF THE DISCLOSURE

There is provided a drive for rotary objects such as winding drums and the like including a toothed driving wheel adapted for connection with the object to be rotated. The driving wheel is driven by a pair of rotary screws, each permanently meshed with the teeth of the driving wheel. The screws are mounted for respective reciprocating longitudinal movement so that alternately one screw is moved longitudinally without turning, thus advancing the driving wheel, while the other screw is longitudinally advanced simultaneously, but additionally rotated so that no axial load is transmitted between the second screw and the driving wheel.

---

The present invention relates to a drive for rotary objects, such as winding drums, sprockets, pin gears and the like, by means of which short-stroke reciprocating linear piston movements are transformed into a continuous or step-wise movement in one direction.

Previously known drives, which are as a rule, hydraulic are not suitable for the transmission of high torque. Moreover, they are complicated and expensive. These disadvantages have been eliminated in the device of the present invention, which is a simplified and economic structure especially suitable for lifting and pulling apparatus and for the transmission of high torque.

The drive according to the invention is mainly characterised by a toothed driving wheel connected with or fixed on the object and two or more screws which permanently mesh the teeth of the driving wheel, the screws being provided with pistons. By means of the pistons and a pressure medium the screws can be moved in their longitudinal direction from the one end position to the other. In performing this movement one of the said screws (which is herein designated as "the first screw") is moved in one direction without being rotated about its longitudinal axis and thereby turns the meshing driving wheel, while at the same time the other screw (which is herein designated as "the second screw") is rotated so as to move in the same direction without transferring any force to the driving wheel. When in the next stroke the screws are then moved in the opposite direction, the second screw will be moved longitudinally without being rotated, so as to turn the driving wheel in the same direction in which it was turned by the first screw, whereas the first screw is now rotated about its longitudinal axis so as to move in the same direction as the second screw is moving, the first screw now not transferring any force to the driving wheel.

Further characteristic features will appear from the following description of an apparatus embodying the invention which is diagrammatically shown in the attached drawing, wherein.

Figure 1:
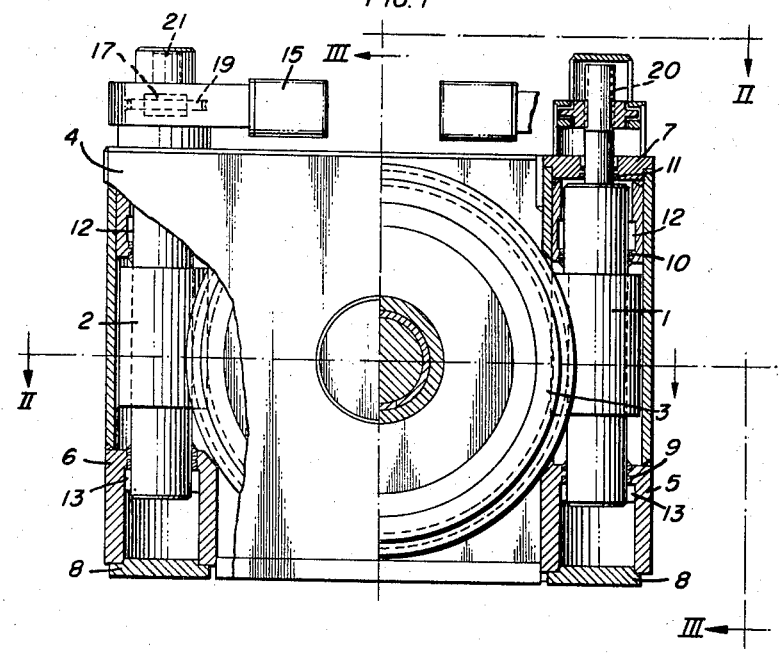
FIG. 1 is a vertical view partly in vertical section on the line I—I in FIG. 2.
Figure 2:
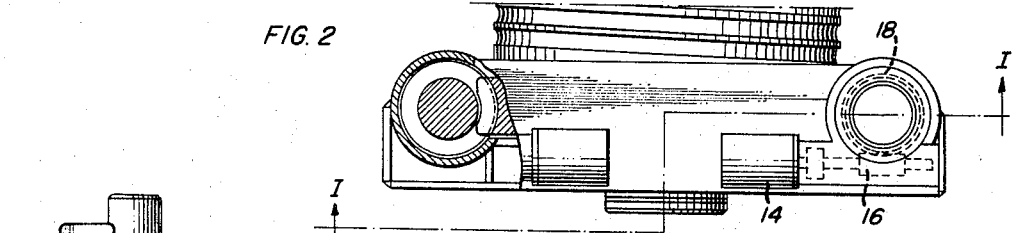
FIG. 2 is a horizontal view of the apparatus with partly horizontal sections along the II—II of FIG. 1.
Figure 3:
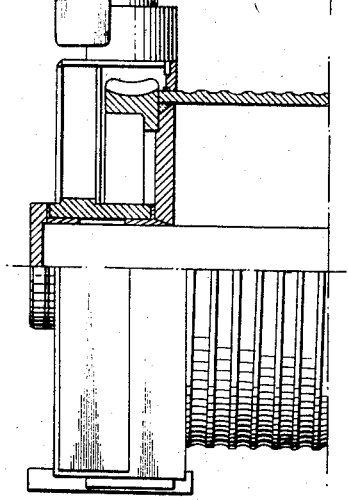
FIG. 3 is a side view of the apparatus partly in section on the line III—III of FIG. 1.

The apparatus illustrated is a drive for a winding drum. It consists mainy of screws 1 and 2, the ends of which are provided with pistons. The screws are permanently in mesh with an intermediate toothed drive wheel 3 which is journalled in a housing 4 which also encloses cylinders 5 and 6. These cylinders are provided with end closures 7 and 8 and gaskets 9, 10 and 11 arranged about the screws 1 and 2, which are journalled longitudinally and rotatably movable in sleeves 12 and 13, the said sleeves also guiding the pistons and screws 1 and 2 to correct meshing with drive wheel 3. Each screw 1 and 2 is coupled with one rotary device; for example a pressure medium motor 14 and 15, respectively, and a worm screw 16, 17 driven by the motor meshing with a toothed wheel 18, 19. This last mentioned toothed wheel is concentrically mounted on a shaft which is fixed at the screw piston and provided with splines 20, 21 for torque transmission from the rotary device to the corresponding screw, which at the same time is movable axially.

The mode of operation will appear from the following example. Both screws 1, 2 are, as shown in FIG. 1, in their upper end position. By means of a hydraulic pipe system known per se pressure medium is injected into the cylinder 5 of the screw 1, in between the upper piston of the screw 1 and the upper closure 7 of the cylinder 5. The screw 1 is thus forced in a downward direction and in so moving the screw 1 turns the drive wheel 3 clockwise. At the same time the motor 15 is rotating screw 2 about its longitudinal axis, so as to move it downwardly, without exerting any driving force on the drive wheel 3, towards the lower end position at which it arrives at the same time as or, preferably, somewhat earlier than the screw 1 arrives at its lower end position.

When the screws 1 and 2 have arrived at their lower end position the hydraulic system is reversed so as to inject pressure medium in between the lower end piston of the screw 2 and the closure 8 of the cylinder 6, and to bring the pressure upon the screw 1 to cease. The screw 2 is thereby moved longitudinally in the upward direction, continuing the clockwise rotation of drive wheel 3. At the same time the motor 14 is rotating the screw 1 about its longitudinal axis so as to move it upwards without exerting any driving force on the drive wheel 3, towards its upper end position, at which it arrives at the same time as the screw 2 arrives at its upper end position or, preferably, somewhat earlier. One entire cycle is now completed and the next one may begin.

At low load the drive wheel may be rotated by means of the motors 14, 15 only, through the screws 1, 2 which, in such case, must not perform any longitudinal movements and consequently, the pressure medium supply to the cylinders 5, 6 may be discontinued.

A guidance control system of known type may be arranged for automatic changing over from rotating the driving wheel 3 at low load by way of the rotation of the screws, to rotating the driving wheel at high load by way of axial movement of the screws, and vice versa.

The apparatus may be stopped at any position of the screws 1, 2. If the apparatus is stopped when the screws 1, 2 are in an intermediate position, it is preferred that one of the screws shall be further moved separately to one of its end positions. Thus, if the apparatus is stopped when the screws are moving downwards but before either of them has arrived at its lower end position, the motor 15 is left on after that the apparatus has been stopped, so that the screw 2 is moved down to its lower end position.

When the apparatus later on is started again, the screw 1 is hydraulically moved downwards, while the screw 2 remains at its lower end position until the screw 1 has arrived at its lower end position, after which the apparatus works as explained above. Alternatively, the apparatus is started by moving the screw 2 hydraulically upwards, while the screw 1 is rotated by the motor 14 so that it also moves upwards towards its upper end position, to which it arrives before the screw 2 arrives at its upper end position. In the upper end position the screw 1 remains until the screw 2 arrives at its upper end position and then the apparatus works in the normal way described above. Irrespective of whether the first starting procedure or the alternative one is used the parallelity is restored in the first semicycle.

Known automatic guidance control systems may be used to obtain the continued rotation of the non-driving screw towards its end position, should the apparatus be stopped when the screws are in the said intermediate positions.

We claim:
1. A drive for rotary objects such as winding drums and the like comprising:
 a toothed driving wheel adapted for operative connection with a rotary object;
 a plurality of rotary screws, each permanently in mesh with the teeth of the driving wheel;
 means mounting the respective screws for reciprocating longitudinal movement between respective end positions;
 power means operatively connected to said screws to move the respective screws simultaneously longitudinally from one end position to the other through respective strokes; and
 rotating means connected to respective screws alternately holding one screw against rotation while providing rotation to the other screw during respective strokes thereof whereby the apparatus functions in such a way that one of the screws is moved by means of the said power means in one direction towards its one end position without being rotated about its longitudinal axis thereby rotating the driving wheel, while the other screw at the same time is rotated so that it moves in the same direction towards its one end position without exerting any driving force on the driving wheel whereas in the succeeding stroke the other screw is moved by means of its power means in the other direction towards its other end position without being rotated about its longitudinal axis, thereby rotating the driving wheel in the direction in which it was rotated by the first screw in the preceding stroke, while the first screw is now being rotated about its longitudinal axis so that it moves axially in the same direction as the other screw towards its other end position without exerting driving force on the driving wheel.

2. A drive as claimed in claim 1, in which said rotating means are a plurality of motors each operatively connected to a respective screw and arranged to rotate the screw while it is moved towards one of its end positions without exerting force on the driving wheel.

3. A drive as claimed in claim 1, in which each motor is a pressure medium motor, the rotation of which is transmitted to the screw through a worm screw and a gear which is mounted on a shaft coaxially arranged on the screw and provided with splines, so that the rotation of the motor can be transmitted to the screw while the latter is at the same time moved in the axial direction.

4. A drive as claimed in claim 1 wherein said power means includes double acting cylinder means operatively connected to provide a drive stroke in each direction of longitudinal movement of said screws.

5. A drive as set forth in claim 3 wherein said double acting cylinder means is defined by a shaft of each screw forming a piston at each end of the screw and extending into a cylinder.

6. A drive as set forth in claim 1 wherein said plurality consists of a pair of screws diametrically opposed relative to said driving wheel.

7. A drive as set forth in claim 6 wherein each of said screws engages said driving wheel tangentially.

8. A drive for rotary objects such as winding drums and the like comprising:
 a toothed driving wheel adapted for operative connection with a rotary object;
 a pair of rotary screws each engaging said driving wheel tangentially and each permanently in mesh therewith;
 power means for selectively moving said screws longitudinally; and
 rotating means for selectively rotating said screws.

References Cited

UNITED STATES PATENTS

| | | | |
|---|---|---|---|
| 1,389,039 | 8/1921 | Estes | 74—29 |
| 3,012,448 | 12/1961 | Abraham | 74—425 |

FRED C. MATTERN, Jr., *Primary Examiner.*

WESLEY S. RATLIFF, *Assistant Examiner.*

U.S. Cl. X.R.

74—422